United States Patent Office 3,494,339
Patented Feb. 10, 1970

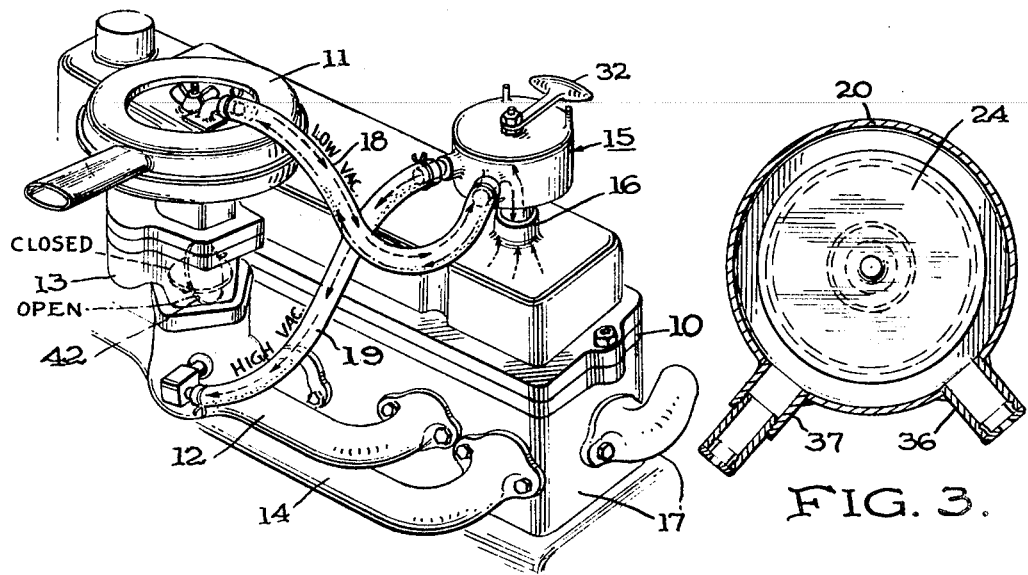
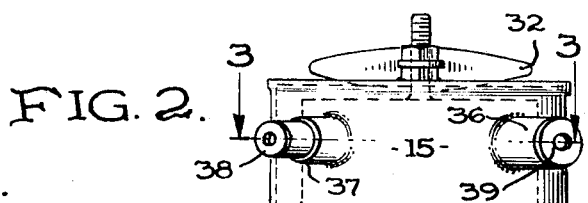
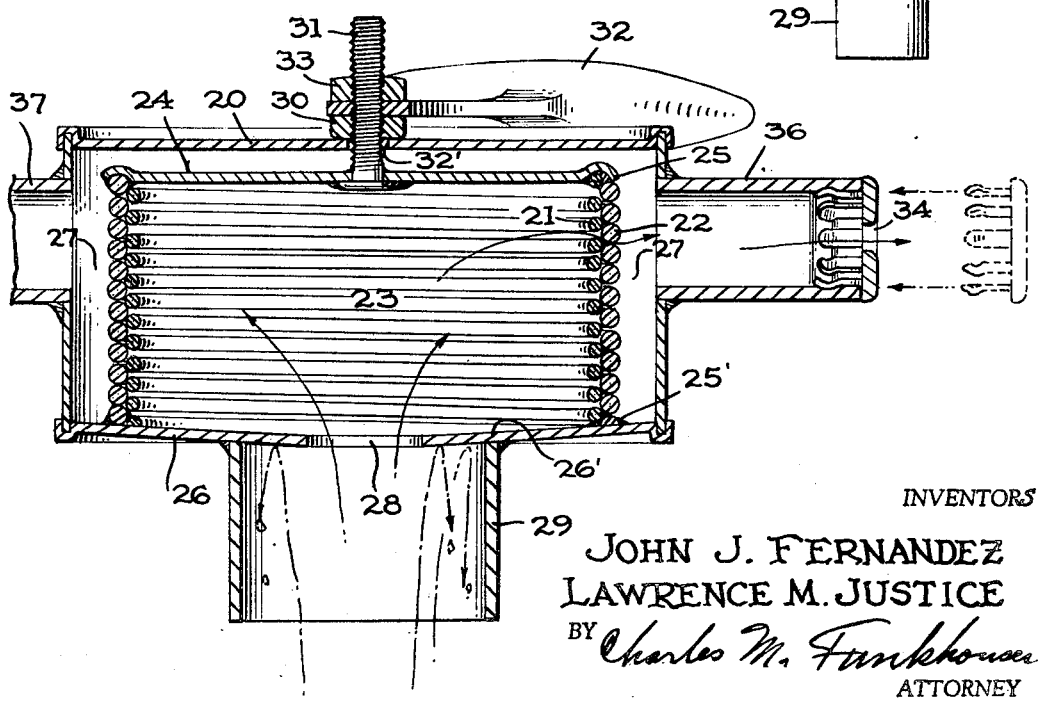

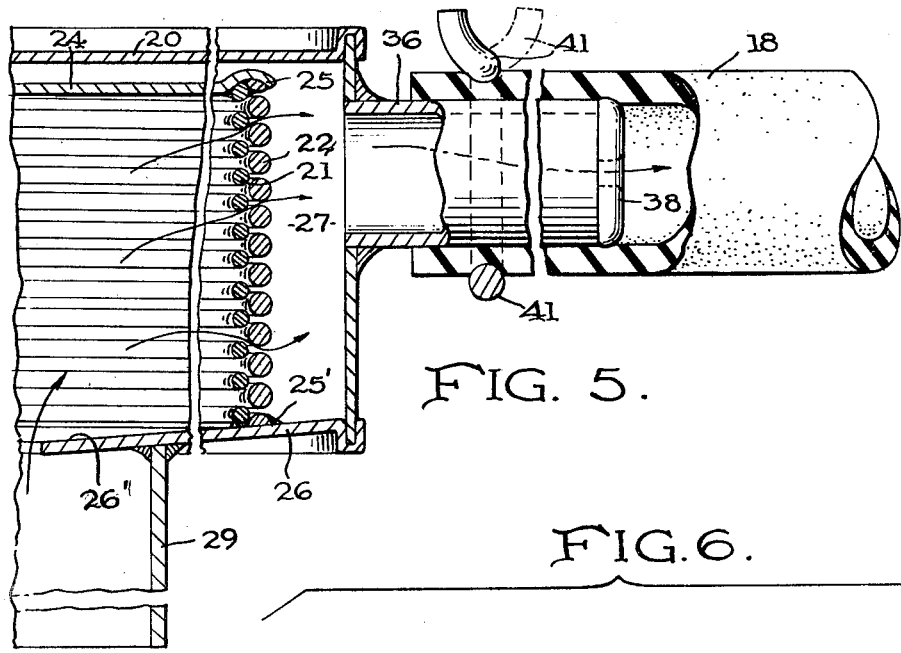
FIG. 5.
FIG. 6.
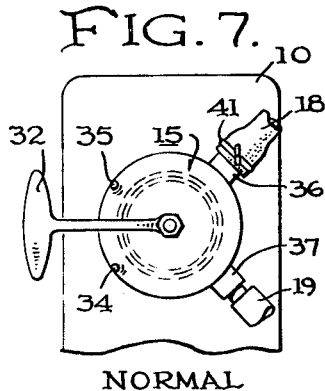
FIG. 7.
NORMAL
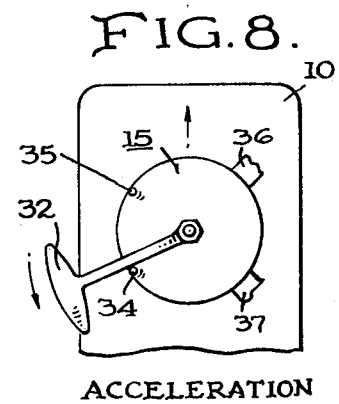
FIG. 8.
ACCELERATION
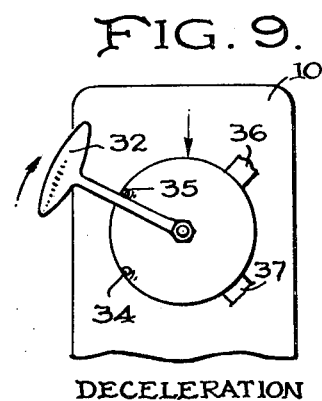
FIG. 9.
DECELERATION
INVENTORS
JOHN J. FERNANDEZ
LAWRENCE M. JUSTICE
BY
*Charles M. Funkhouser*
ATTORNEY

3,494,339
SELF-CLEANING SMOG CONTROL FILTER AND FIRE TRAP FOR INTERNAL COMBUSTION ENGINES
John Jame Fernandez, 144 E. Encinitas, and Lawrence M. Justice, 139 E. Greystone, both of Monrovia, Calif. 91016
Filed June 14, 1967, Ser. No. 649,413
Int. Cl. F02m 7/00, 17/18; B01d 29/06
U.S. Cl. 123—119                            9 Claims

ABSTRACT OF THE DISCLOSURE

This invention relates to a smog control system for automotive internal combustion engines employing a novel blowby filter including relatively movable interleaved wire coils, the filter being connected to the engine crankcase in combination with an air filter connected in the carburetor induction system to recycle all gaseous fuels from the engine crankcase through the engine to eliminate all non-combustible matter from entering the exhaust manifold of the engine and being discharged to the atmosphere.

---

This invention relates to a novel induction system for internal combustion engines for the purpose of effectively reducing air pollution from the exhaust system of an internal combustion engine.

More particularly the invention resides in the combination of a novel crankcase ventilating system and filter control mechanism which shall effectively regulate the air-fuel ratio and eliminate any resinous gum or solid matter to produce the desired complete combustion of fuel before exhausting said combustion products to the atmosphere and thus reduce to a minimum any smog producing ingredients.

One of the objects of our invention is to provide a novel carburetion system wherein complete fuel combustion is obtained by sealing the crankcase and recycling any fluids or gases occurring in the crankcase of the engine by passing the same in a controlled manner through a novel self-cleaning filter construction communicating directly with the crankcase and arranged for supplying the necessary amount of air so that the gases may be returned to the intake manifold of the engine for reburning and thus eliminate any and all smog-producing residue from the exhaust manifold.

Another object of the invention is to utilize each stroke of the piston in an engine cylinder, which causes crankcase pressure, to effect regulation of the novel filter to eliminate the passage of any deleterious residue of resins, gums and any other solid matter normally present in the vaporized engine fuel and passed to the crankcase caused by blowby gasoline fuel combustion products passing the engine piston and lodging in the engine crankcase ventilating connections.

Another object of the invention is to provide an inertia controlled mechanical filter which shall respond to the motion of the vehicle in which the filter is installed, the crankcase pressure and the intake manifold pressure and thus aid in maintaining the desired fuel-air ratio and completely eliminate any contaminant in the exhaust system.

Another object of the invention is to provide a novel self-cleaning filter which shall provide for the constant flow of crankcase blowby fuel and gases and return any fluid or solid residue to the crankcase oil reservoir for recirculation to an oil filter where it is disposed of in the usual and well known manner.

Another object of the invention is to provide for the passage of purified gas from the inertia controlled filter through an orifice restriction connection of predetermined size to the engine manifold and the carburetor system leading to the combustion chamber of an internal combustion engine to regulate the air-fuel ratio to effect continuous complete fuel combustion.

Another object of the invention is to provide a novel combination filter and fire trap arrangement in the induction system which shall automatically maintain the gas and air ratio and effectively prevent any flame propogation in the system due to engine backfire and the like.

A further object of the invention is to provide a closed crankcase gas recycling apparatus which shall be in communication between the crankcase and the engine air induction system to prevent flame propagation at idling speeds, accelerated load speeds and deceleration engine speeds.

These and other objects of the invention will be more manifest from the following specification and drawings and specifically set forth in the claims.

In the drawings:

FIGURE 1 is a perspective view of an internal combustion engine embodying our invention and indicating air flow in the connecting pipes;

FIGURE 2 is a perspective view in elevation of the air filter embodied in our novel system;

FIGURE 3 is a sectional view on line 3—3 of FIGURE 2;

FIGURE 4 is an enlarged sectional view in elevation of the air filter shown in FIGURE 2;

FIGURE 5 is an enlarged fragmentary sectional view in elevation of the filter shown in FIGURE 2 and illustrating the expanded coil springs for regulating the passage of air and self-cleaning action;

FIGURE 6 is a composite view of different sizes of air valve orifice regulators for certain operating conditions; and FIGURES 7, 8 and 9 are top plan views showing the different operative positions effected automatically by an inertia member connected to the internal filter coil springs within the casing and actuated by the movement of the vehicle and the crankcase pressure.

Referring to the drawings there is shown in FIGURE 1 our invention as applied to an automobile engine 10 employinug an air filter 11, intake manifold 12, carburetor 13, and exhaust manifold indicated by the numeral 14, all of which are the usual parts of an automobile carburetion system.

Our novel smog control device and fire trap contemplates a second novel filter 15 mounted on the usual breather or vent pipe opening indicated at 16 in an engine crankcase indicated at 17, thus providing a closed recycling system for any crankcase gases. The filter 15 is connected in the system by a conduit passage 18 leading to the carburetor inlet through the air filter 11 which is mounted thereon and a conduit 19 connecting the intake manifold 12 thus forming an intermediate link between the engine crankcase and the carburetor induction system to recycle any gases as hereinafter described.

The filter 15 comprises a substantially cylindrical casing member 20 which may be made of any suitable material such as plastic or sheet metal and houses relatively movable inner and outer coil spring filter elements 21 and 22, as shown in FIGURES 4 and 5. These filter elements are preferably in the form of intermeshing spring steel wire coils of relatively large and small diameter wire and cooperate to form a cylindrical walled internal filter chamber 23. The inside crevice convolutions of the outside coil 22 receive the second coiled spring wire 21 of smaller diameter to form an adjustable porous like wall of the filter chamber 23 caused by the relative movement of the coils. The top of the coiled spring chamber 23 is closed by a cap 24 to which the adjacent ends of the large and small wire coils are rigidly attached as by soldering or welding to form a pressure-tight seal connection as indicated at 25. The bottom of adjacent coil ends are rigidly attached to the inside bottom wall 26 of the filter casing 20 in a similar manner as indicated at 25', thus forming the dividing filter walls of chamber 23 and an outer chamber 27 in the filter casing. The outer chamber 27 connects with the carburetor induction system by conduits 18 and 19 and the crankcase 17 by way of conduit 16.

The bottom wall 26 of the filter casing is made sloping or depressed as indicated at 26' to drain any accumulated noncombustible fluid or solid matter to a central opening 28 leading to a central supporting conduit 29 which is connected to the crankcase 17 and thus return any residue directly to the crankcase oil reservoir for disposal in the usual manner.

The top of the casing 20 supports an external bearing member 30 which receives an adjustably threaded shaft member 31 which projects freely through an opening 32' in the casing 20. This shaft is fixedly connected directly to the inner filter cap member 24 so that there is freedom of movement between shaft 31 and casing 20. The shaft 31 is also adjustably connected to a weighted lever arm inertia member 32 by a nut 33, for example. This inertia member is preset or calibrated to initially space the particular filter elements 21–22 and is fixed to the cap 24 in any suitable manner as by brazing or soldering. The inertia member setting is for the normal operating conditions of the motor system and may move forward or backward between convenient limit stops 34 and 35 on the casing 20, as shown in FIGURES 7, 8 and 9. This indicates how automatically and continuously the coil filter elements move in a winding and unwinding relation to regulate the passage of air therethrough and how the filter coils are cleaned of any gum or resin collected thereon whenever the engine is running and using fuel in the system.

The filter casing chamber 27 is also provided with tubular outlet nipple connections 36 and 37 to receive selected sizes of detachable spring fitting tubular orifice members as shown in composite FIGURE 6 and connect with induction conduits 18 and 19. These two connections 36 and 37 lead to differential high and low vacuum pressure portions of the fuel intake manifold system to regulate and maintain the desired fuel-air ratio for complete fuel combustion and provide maximum engine performance. These differential pressure conditions are indicated in FIGURE 1 by the dotted flow lines 18'–19'. Each of the nipple connections 36 and 37 is adapted to receive its appropriate size spring fitting orifice member 38 or 39 and be bound to its respective connecting conduit by a suitable binder element indicated at 41 in FIGURE 5. These restrictor elements 38, 39 and 40 are readily changed to balance and assist in maintaining the air to fuel ratio in the intake manifold so as to obtain maximum performance of the engine under all operating conditions.

The two-way back-fire trap feature incorporated in the filter 15 is enhanced by its particular location in the system and its adjustable coil spring walls 21–22 forming the chambers 23 and 27. Chamber 23 is in direct communication with the crankcase by conduit connection 29. The chamber 27 communicates with the engine inlet manifold 12 by a conduit 19 and another conduit 18. For example, if a fire flame should start in the crankcase as a result of blowby gas accumulation in the crankcase it could not pass the coil spring wall of chamber 23 because of the location of the inner coil spring 21. If fire takes place in the intake manifold due to any engine combustion defects it is immediately arrested by the high or low vacuum conditions existing in chamber 27 and intercepted by the action of the filter walls 21 and 22. Also, if a back-fire should ignite fuel in the carburetor the fire flame would be drawn through the low vacuum tube to chamber 27 which at this time is drawn by the high vacuum side to the intake manifold and directly into the engine cylinder combustion chambers.

The self-cleaning feature of the spring walls of the filter, as well as its filtering action on the crankcase fumes, is effected by the forcible twisting movement of the inertia member 32 in its forward and backward movement. As is well known, all motor fuels contain some form of gums or resins which deposit a sticky residue upon being burned in an internal combustion engine chamber. It is the constant accumulation of this residue that clogs or renders ineffective many smog control valve devices employing small plunger operated valves or plate valves now on the market and which require constant expensive servicing. In other words, it is necessary to maintain complete combustion of the fuel under all operating conditions of the engine whether idling, accelerating or decelerating.

In a used automobile engine installation, when the cylinder piston parts become worn, there is more blowby gases and fuel carried into the crankcase which frequently cause disastrous fires or explosions. In any condition of operation it is necessary to maintain a proper fuel-air ratio to obtain complete combustion of fuel so that no contaminants due to incomplete combustion shall reach the atmosphere through the engine exhaust manifold.

The high and low vacuum conditions are regulated by the position of the accelerator operated carburetor butterfly valve, indicated by numeral 42, and the selected size of the orifices 38–40 in the carburetor induction conduit 12. It will be appreciated that each engine piston stroke creates pressure in the crankcase and this is transmitted directly to the filter chamber 23 and thus the chamber filter wall coils are changed in response to the combined movements of the inertia member 32 and the pressure in the crankcase. Since the member 32 responds to the movement of the vehicle, either at rest as shown in FIGURE 7 for normal filtering operation and extreme filtering operation at forward or backward positions as shown in FIGURES 8 and 9, respectively, desired filtering is obtained at all times.

In order to improve the accuracy of the action of the interaction of the coil springs 21 and 22, the spring surfaces are provided with a lubricant (not shown) and thus when they encounter any gum or solid residue, the constant movement breaks the seal clogging effect and provides a most reliable control of the novel filtering system to prevent the passage of smog-producing material to the engine intake manifold under all conditions of vehicle operation.

For example, we have found that the small orifice air restrictor 37, shown in FIGURE 6, may be most desirable for admitting additional air to the induction system of new automobiles, the orifice 38 for older cars, while a large orifice 39 may be necessary for extreme blowby conditions. Where the piston and cylinder parts are more badly worn they need more air for the carburetion system because of excessive blowby leakage in the piston chambers and other loose connections to obtain proper combustion and thus eliminate unburned particles in the discharge exhaust to the atmosphere.

It will be understood that the inertia member 32 when in the normal position as indicated in FIGURE 7, vapors will normally pass through the filter as indicated and calibrated in FIGURE 5; but when any sudden acceleration or deceleration takes place, the spring coils move to regulate the flow of vapors as heretofore described. Thus when the engine is idling, the butterfly valve 42 is closed, there is low vacuum in the intake manifold upstream of the valve, and when the engine speeds up by opening the valve 42 and vacuum is increased, all of which is the usual performance in an internal engine performance.

What is claimed is:

1. In a system for recycling gaseous fluids through the combustion zone of an internal combustion engine, wherein passage means convey gaseous fluid normally called blowby from the engine crankcase to the intake manifold of the engine, the improvement comprising: a filter casing having a first and second chamber formed by relatively movable filter wall parts therein, said movable filter wall parts being interleaved wire coils having their lower adjacent ends rigidly connected to the casing wall and their top ends rigidly connected to a movable cap portion of the first chamber, an open passage means leading from the engine crankcase to the first chamber in the filter, a throttled passage means leading from the second chamber in the filter to the top of a carburetor air cleaner at low vacuum, a second throttled passage means also leading from the second chamber to the intake manifold at a high vacuum, and means for energizing the filter by the pulsating pressure in the engine crankcase.

2. The improvement as set forth in claim 1 in which the movable filter parts are automatically moved and cleaned by the motion of the engine to which the filter is attached to regulate the recycling of the gaseous fluid in the system.

3. The improvement as set forth in claim 1 in which the movement of the filter chamber wall parts is effected by an inertia member having limited forward and rearward movement.

4. The improvement as set forth in claim 1 in which the filter chamber wall elements are in constant motion when the engine is operating to recycle gaseous fluids from the crankcase to the engine intake and passage means for returning noncombustible matter to the engine crankcase.

5. The improvement as set forth in claim 1 wherein the filter elements are moved by an inertia element to provide a backfire trap between the crankcase and the carburetor and controlled by relative vacuum conditions in the system.

6. The improvement as set forth in claim 1 in which an inertia member is connected to the filter coil cap member and rotates the same to change the pressure of the spring convolutions.

7. The improvement as set forth in claim 1 in which the wire coils of the filter chamber are initially lubricated to prevent sticking.

8. Apparatus of the character described in claim 1 including an air filter connected to the intake of said carburetor and another connection from the outlet of the blowby filter to the air filter whereby all combustible gases are recycled through the engine for complete combustion without passing to the exhaust manifold.

9. Apparatus of the character described in claim 1 including a detachable calibrated orifice member located in each first and second passage means to regulate the crankcase pressure in recycling the gases in the system.

References Cited

UNITED STATES PATENTS

| | | |
|---|---|---|
| 1,395,932 | 11/1921 | Staude. |
| 1,760,315 | 5/1930 | Nacket. |
| 2,125,435 | 8/1938 | Erling. |
| 2,354,722 | 8/1944 | Walton. |
| 2,458,118 | 1/1949 | Tursky _____ 55—520 X |
| 3,151,604 | 10/1964 | Walker et al. |
| 3,170,448 | 2/1965 | Campbell. |
| 3,234,925 | 2/1966 | Cahn. |

AL LAWRENCE SMITH, Primary Examiner

U.S. Cl. X.R.

55—283, 520; 123—25, 142